United States Patent
Jansson

(10) Patent No.: US 7,261,011 B2
(45) Date of Patent: Aug. 28, 2007

(54) TRANSMISSION

(75) Inventor: Daniel Jansson, Eskilstuna (SE)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 0 days.

(21) Appl. No.: 11/421,685

(22) Filed: Jun. 1, 2006

(65) Prior Publication Data
US 2006/0213299 A1 Sep. 28, 2006

Related U.S. Application Data

(63) Continuation of application No. PCT/SE2004/001717, filed on Nov. 24, 2004.

(30) Foreign Application Priority Data
Dec. 22, 2003 (SE) .................................. 0303530

(51) Int. Cl.
*F16H 3/08* (2006.01)
(52) U.S. Cl. .......................... 74/329; 74/331
(58) Field of Classification Search ................ 74/325, 74/329, 330, 331, 340
See application file for complete search history.

(56) References Cited

U.S. PATENT DOCUMENTS

| | | | | |
|---|---|---|---|---|
| 5,592,854 A | | 1/1997 | Alfredsson | |
| 5,974,905 A | * | 11/1999 | Hedman | 74/331 |
| 6,050,152 A | * | 4/2000 | Alfredsson | 74/325 |
| 6,186,029 B1 | * | 2/2001 | McQuinn | 74/718 |
| 7,080,566 B2 | * | 7/2006 | Baldwin et al. | 74/331 |
| 2001/0039847 A1 | | 11/2001 | Hatakeyama et al. | |

FOREIGN PATENT DOCUMENTS

| | | |
|---|---|---|
| DE | 10060699 A1 | 6/2001 |
| FR | 2790297 A1 | 9/2000 |

OTHER PUBLICATIONS

International Search Report for corresponding International Application PCT/SE2004/001717.

* cited by examiner

*Primary Examiner*—Roger Pang
(74) *Attorney, Agent, or Firm*—WRB-IP LLP

(57) ABSTRACT

A transmission comprising three parallel shafts and gearwheels carried by the shafts, which intermesh with one another in pairs for transmitting torque either between the first shaft and the third shaft, or between the second shaft and the third shaft. At least one gearwheel in each pair of intermeshing gearwheels is rotatably supported on its shaft and can be locked to or disengaged from its shaft by means of associated clutch members. Gearwheels on the first shaft and second shaft are coordinated by clutch members, by means of which at least two gearwheels on each shaft can be disengaged from their shaft but coupled together for rotation together in order to permit the transmission of torque from the first shaft via the third and the second shaft back to the third shaft, and from the second shaft via the third and the first shaft back to the third shaft.

4 Claims, 5 Drawing Sheets

TRANSMISSION

The present application is a continuation of International Application PCT/SE2004/001717, filed Nov. 24, 2004, which claims priority to SE 0303530-0, filed Dec. 22, 2003.

BACKGROUND AND SUMMARY

A transmission comprising first, second and third parallel shafts and gearwheels which are carried by the shafts.

The present invention relates to a transmission, comprising first, second and third parallel shafts, rotatably supported in a casing, and gearwheels which are carried by the shafts and which intermesh with one another in pairs for transmitting torque either between the first shaft and the third shaft, or between the second shaft and the third shaft, and of which at least one gearwheel in each pair of intermeshing gearwheels is rotatably supported on its shaft and can be locked to or disengaged from its shaft by means of associated clutch members.

The use of transmissions of the type described above in vehicle gearboxes of having two concentrically supported input shafts, which can each be drive-connected to the output shaft of an internal combustion engine via its own disk clutch, is already known. In such a "power shift" gearbox the first and second shafts form two intermediate shafts, the third shaft usually forming the output shaft, to which torque is transmitted alternately via the one or the other intermediate shaft through alternating engagement of the disk clutches. When driving in a selected gear, the next gear is usually pre-selected by engagement of the relevant gearwheel on the currently non-driven intermediate shaft prior to the actual gearshift, so that the actual gearshift can, in principle, take place without interruption of the torque through simultaneous disengagement of the currently engaged disk clutch and engagement of the other disk clutch.

Such "power shift" gearboxes are often used in heavier trucks and plant vehicles and commonly have a total of ten or more gear ratios. The more gear ratios the gearbox is designed to have, the more gearwheels and clutches it requires and the more difficult it becomes to achieve suitable steps between the various gears in combination with an optimum span between the highest and the lowest gear ratio. A known method of minimizing the number of input shafts with associated clutch members is to have some or all gearwheels on the output shaft mesh with corresponding gearwheels on the two intermediate shafts. This means that the freedom to select steps between the various gears is more limited the greater the number of gearwheels on the intermediate shafts that mesh with common gearwheels on the output shaft. Maximum freedom, on the other hand, is obtained if each intermediate shaft gearwheel meshes with its own gearwheel on the output shaft, but this is then achieved at the expense of an increased number of requisite components.

It is desirable to provide a transmission of the type specified in the introductory part, which having few constituent components permits a large number of gear ratios with even steps between the gears.

According to an aspect of the present invention, at least two gearwheels rotatably supported on the first shaft and two gearwheels rotatably supported on the second shaft are coordinated by clutch members, which have neutral positions, in which both gearwheels are disengaged from their shaft and from one another, first engagement positions, in which the gearwheels are disengaged from the shaft but are coupled together for rotation together, and second engagement positions, in which one of the gearwheels is disengaged and one is locked to the shaft, and that the two gearwheels mesh with gearwheels on the third shaft in order to permit the transmission of torque from the first shaft via the third and the second shaft to the third, or from the second shaft via the third and the first shaft to the third shaft.

In a preferred embodiment of the transmission according to the invention three gearwheels are used on the first and the second shaft, the gearwheels being coordinated by clutch members, which have first engagement positions, in which either the first and the second or the second and the third gearwheel are disengaged from the associated shaft but are coupled together for rotation together.

By thus using three gearwheels with associated clutch members on the first and second shaft, it is possible, by way of a total of just eleven gearwheels, to transmit torque from the first or second shaft to the third shaft or vice-versa, with ten different gear ratios.

BRIEF DESCRIPTION OF THE DRAWINGS

The invention will be described in more detail with reference to exemplary embodiments shown in the drawings attached, in which.

DETAILED DESCRIPTION

Figure 1:
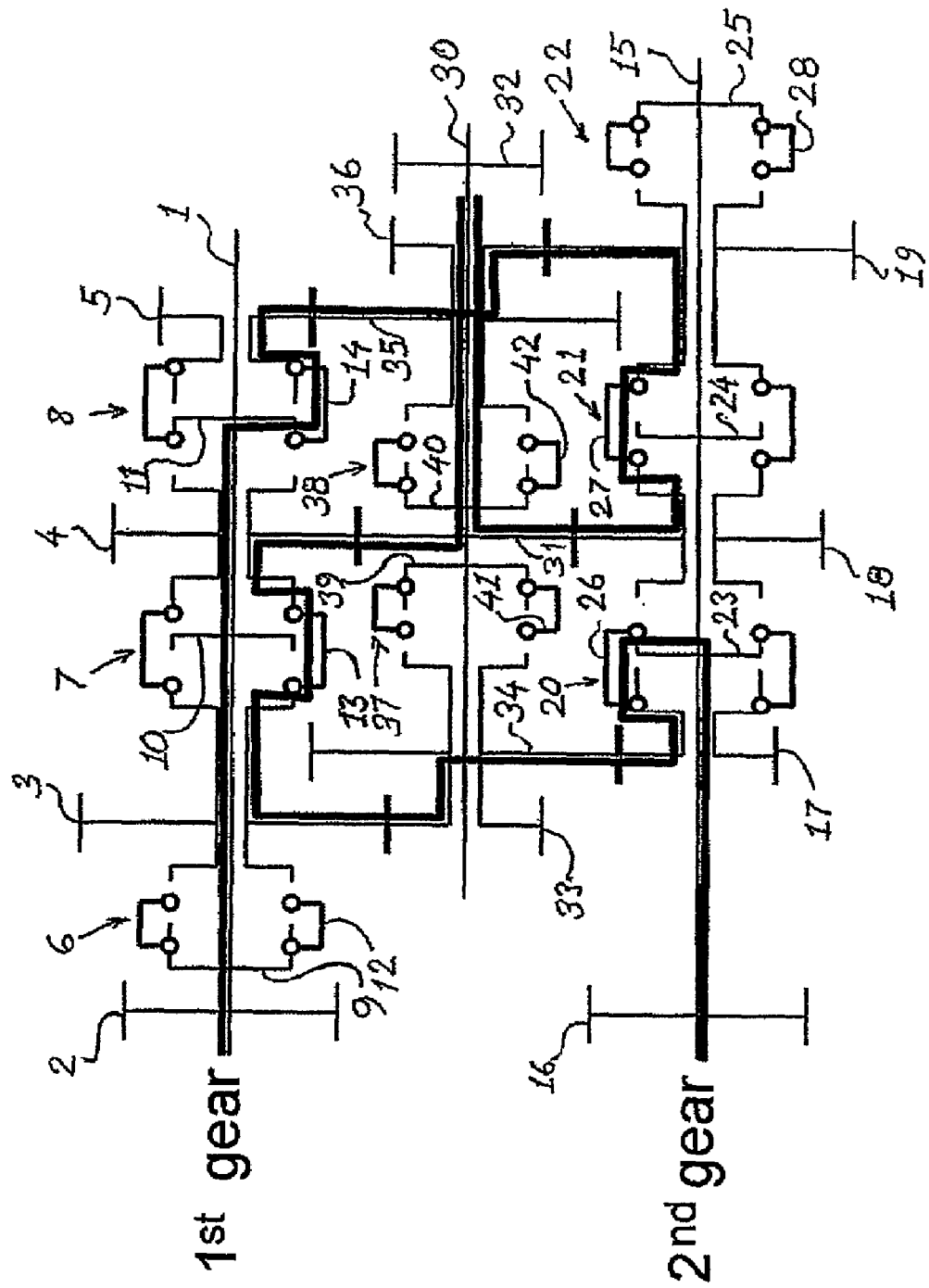
FIGS. 1 to 5 show schematic longitudinal sections through an embodiment of a transmission according to the present invention with the torque transmission in the various gears marked.

The transmission has a first shaft 1, which is rotatably supported in a casing (not shown) and has a gearwheel 2 fixedly connected to the shaft, and three gearwheels 3,4 and 5 which are rotatably supported on the shaft and which are coordinated by three clutch devices 6,7 and 8, which each comprise a hub 9, 10 and 11 fixedly connected to the shaft 1, a clutch sleeve 12, 13 and 14, supported so that it is axially displaceable on the respective hub 9-11, and synchromesh devices not shown in more detail.

The transmission furthermore has a second shaft 15, which is rotatably supported in the casing and has a gearwheel 16 fixedly connected to the shaft, and three gearwheels 17, 18 and 19 which are rotatably supported on the shaft and which are coordinated by three clutch devices 20, 21 and 22, which each comprise a hub 23, 24 and 25 fixedly connected to the shaft, a clutch sleeve 26, 27 and 28, supported so that it is axially displaceable on the respective hub 23-25, and synchromesh devices not shown in more detail.

A third shaft 30 rotatably supported in the casing has two gearwheels 31 and 32 fixedly connected to the shaft, a first pair of gearwheels 33 and 34 which are connected to one another and are capable of rotating together on the shaft, and a second pair of gearwheels 35 and 36, which are connected to one another and are capable of rotating together on the shaft. The pairs of gearwheels 33, 34 and 35, 36 are each coordinated by their clutch device 37 and 38 respectively, which each comprise a hub 39 and 40 fixedly connected to the shaft 30, a clutch sleeve 41 and 42 respectively, supported so that it is axially displaceable on the respective hub 39,40, and synchromesh devices not shown in more detail.

The clutch device 6 on the shaft 1 has two positions, that is a neutral position, in which it disengages the gearwheel 3 from the shaft 1, and an engagement position, in which it locks the gearwheel 3 to the shaft 1.

The clutch 7 on the shaft 1 has three positions, that is a neutral position, in which it disengages the gearwheels 3 and 4 from the shaft 1 and from one another, a first engagement position, in which it disengages the gearwheels 3 and 4 from the shaft 1 but keeps them coupled together, and a second engagement position, in which it disengages the gearwheel 3 from the shaft 1 and locks the gearwheel 4 to the shaft 1.

The clutch 8 on the shaft 1 has three positions, that is a neutral position, in which it disengages the gearwheels 4 and 5 from the shaft 1 and from one another, a first engagement position, in which it disengages the gearwheels 4 and 5 from the shaft but keeps them coupled together, and a second engagement position, in which it disengages the gearwheel 4 from the shaft 1 and locks the gearwheel 5 to the shaft 1.

The clutch 20 on the shaft 2 has three positions, that is a neutral position, in which it disengages the gearwheels 17 and 18 from the shaft 2 and from one another, a first engagement position, in which it disengages the gearwheels 17 and 18 from the shaft 2 but keeps them coupled together, and a second engagement position, in which it disengages the gearwheel 18 from the shaft and locks the gearwheel 17 to the shaft 2.

The clutch 21 on the shaft 2 has three positions, that is a neutral position, in which it disengages the gearwheels 18 and 19 from the shaft 2 and from one another, a first engagement position, in which it disengages the gearwheels 18 and 19 from the shaft but keeps them coupled together, and a second engagement position, in which it disengages the gearwheel 19 from the shaft and locks the gearwheel 18 to the shaft 2.

The clutch 22 on the shaft 2 has two positions, that is a neutral position, in which it disengages the gearwheel 19 from the shaft 2, and an engagement position, which locks the gearwheel 19 to the shaft 2.

The clutches 37 and 38 on the shaft 30 have two positions, that is a neutral position, in which the gearwheel pairs 33 and 34, 35 and 36 are disengaged from the shaft 30, and an engagement position, in which the gearwheel pairs 33 and 34, 35 and 36 are locked to the shaft 30.

In one embodiment of the transmission according to the invention the gearwheels 2 and 16 on the shafts 1 and 15 respectively are designed to be driven alternately by a pair of input shafts, each via its disk clutch (not shown). The shafts 1 and 15 then form a pair of intermediate shafts and the shaft 30 and output shaft.

In such a transmission of the so-called power shift type torque is transmitted via the one intermediate shaft in all odd gears and via the other intermediate shaft in all even gears.

FIGS. 1 to 5 illustrate the torque transmission path of the various transmission steps in a transmission having ten gears. By connecting the transmission to a clutch and reverse unit of the type shown and described in SE 0300497-5, a gearbox with ten forward gears and ten reverse gears is obtained.

FIG. 1 illustrates the torque transmission in $1^{st}$ and $2^{nd}$ gear. The clutch 6 is in its neutral position, the clutch 7 is in its first engagement position and the clutch 8 is in its second engagement position. The clutches 37 and 38 on the shaft 30 are in their neutral positions, whilst the clutch 20 on the shaft 15 is in its second engagement position and locks the gearwheel 17 to the shaft. The clutch 21 is in its first engagement position and the clutch 22 in its neutral position.

When driving the shaft 1 with the shaft 15 disengaged, torque is transmitted in $1^{st}$ gear from the shaft 1 to the shaft 30 via the gearwheels 5, 35, 36, 19, 18 and 31. By disengaging the shaft 1 and engaging the shaft 15 the gear is disengaged. Through the clutch positions described above the 2nd gear is pre-selected and when the shaft 15 is driven torque is transmitted in $2^{nd}$ gear from the shaft 15 to the shaft 30 via the gearwheels 17, 34, 33, 3, 4 and 31. In and gears, therefore, all three shafts are involved in the torque transmission, the clutches 7 and 21 being used to transmit torque between adjacent gear wheels without the gearwheels being locked to the associated shaft.

Figure 2:
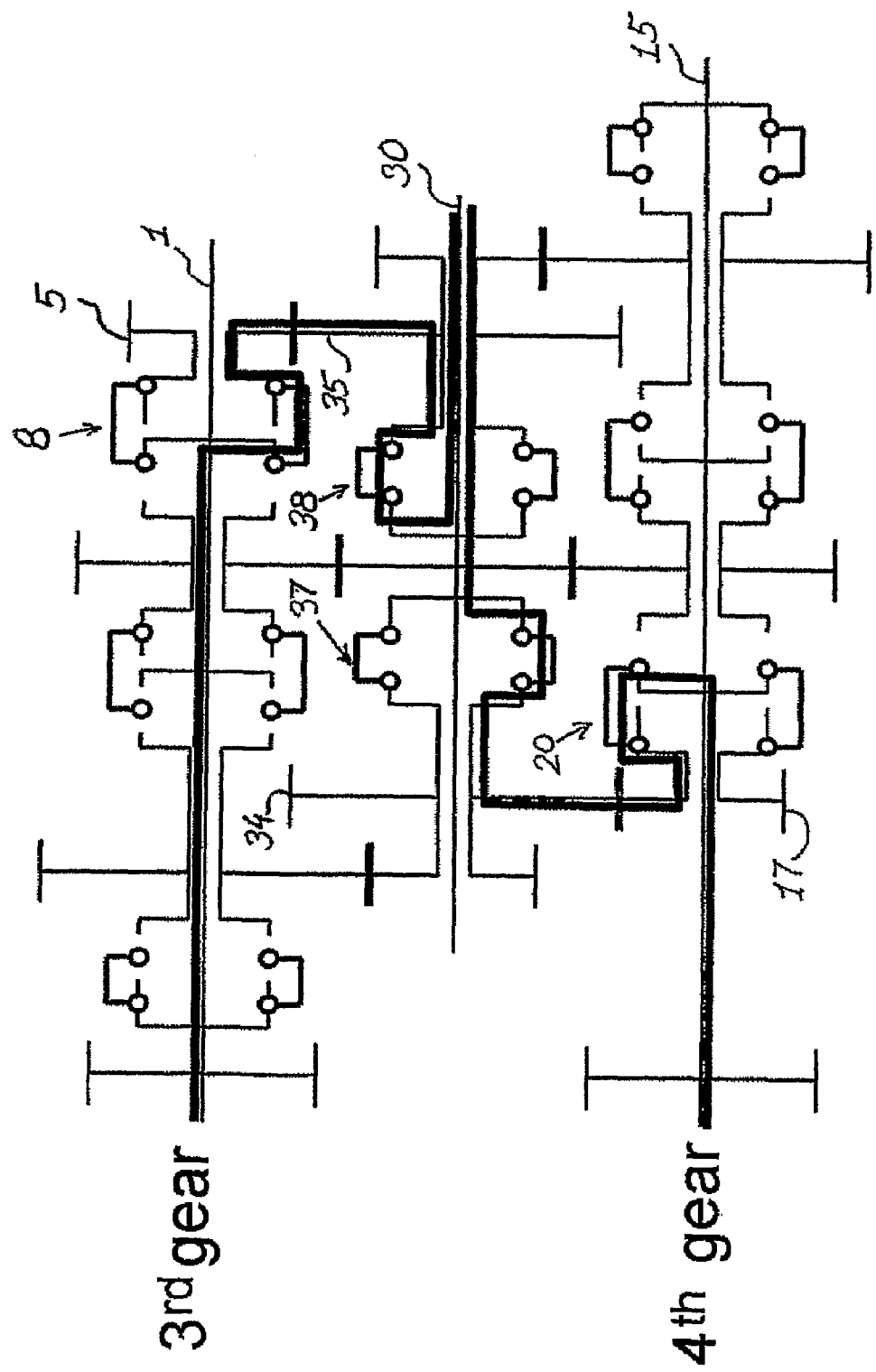

FIG. 2 illustrates the torque transmission in $3^{rd}$ and $4^{th}$ th gear. As in $1^{st}$ gear, when transmitting torque in $3^{rd}$ gear the clutch 8 is in its second engagement position and locks the gearwheel 5 to the shaft 1, but instead of serving only as intermediate gear, the gearwheel 35 is now locked to the shaft 30 by the clutch 38 for transmitting torque directly from the shaft 1 to the shaft 30 via the gearwheels 5 and 35. As in $2^{nd}$ gear, when transmitting torque in $4^{th}$ gear the clutch 20 is in its second engagement position and locks the gearwheel 17 to the shaft 15 for transmitting torque directly from the shaft 15 to the shaft 30 via the gearwheels 17 and 34, which are locked to the shaft 30 by the clutch 37.

Figure 3:
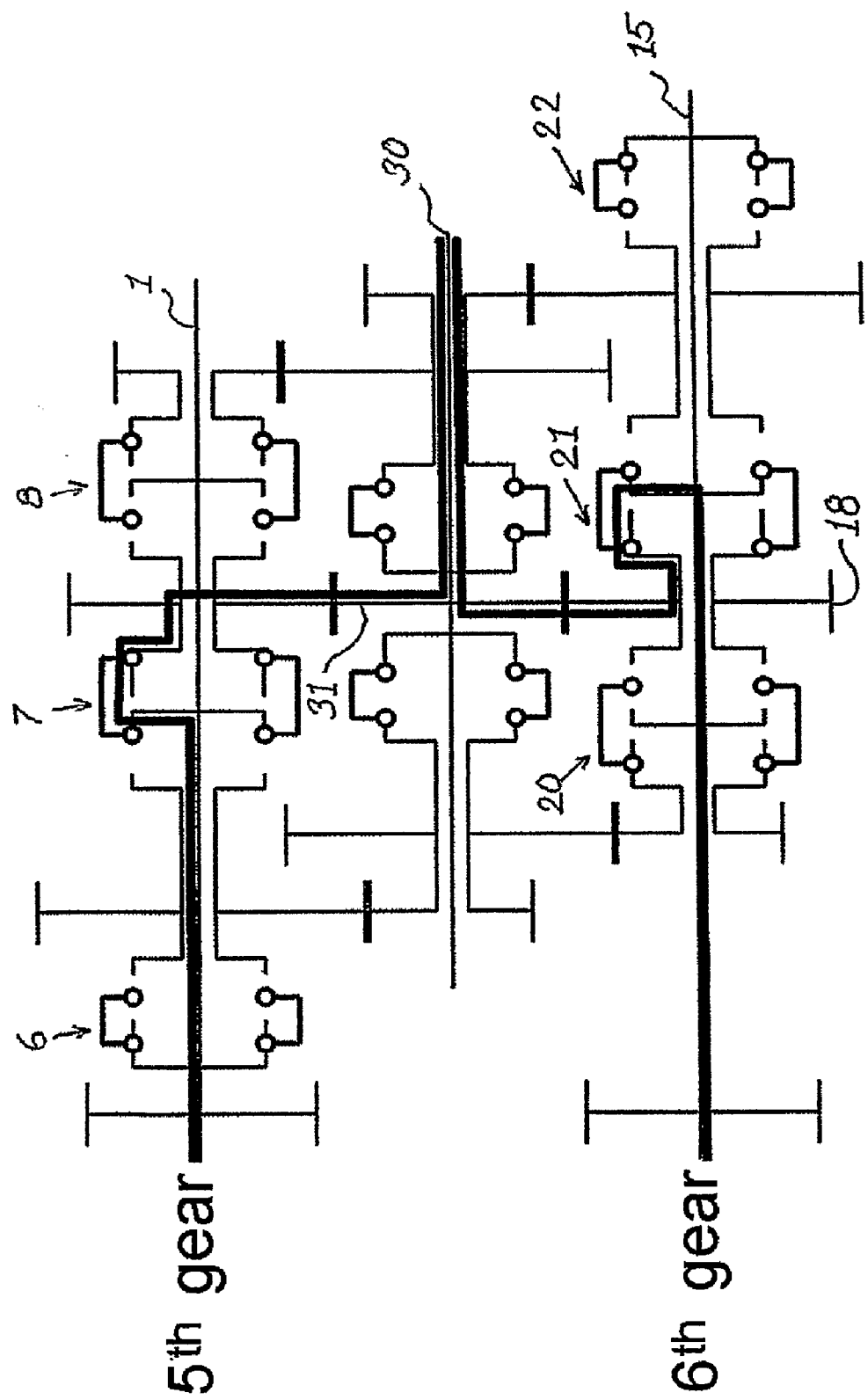

FIG. 3 illustrates the torque transmission in $5^{th}$ and $6^{th}$ gear. When transmitting torque in $5^{th}$ gear the shaft 1 drives, the clutches 6 and 8 are in their neutral positions and the clutch 7 is in its second engagement position and locks the gearwheel 4 to the shaft 1. Via the gearwheel 31 fixed to the shaft 30, torque is transmitted directly to the shaft 30. When transmitting torque in $6^{th}$ gear the shaft 15 drives, the clutches 20 and 22 are in their neutral positions and the clutch 21 is in its second engagement position and locks the gearwheel 18 to the shaft 15. Via the gearwheel 31 fixed to the shaft 30, torque is transmitted directly to the shaft 30.

Figure 4:
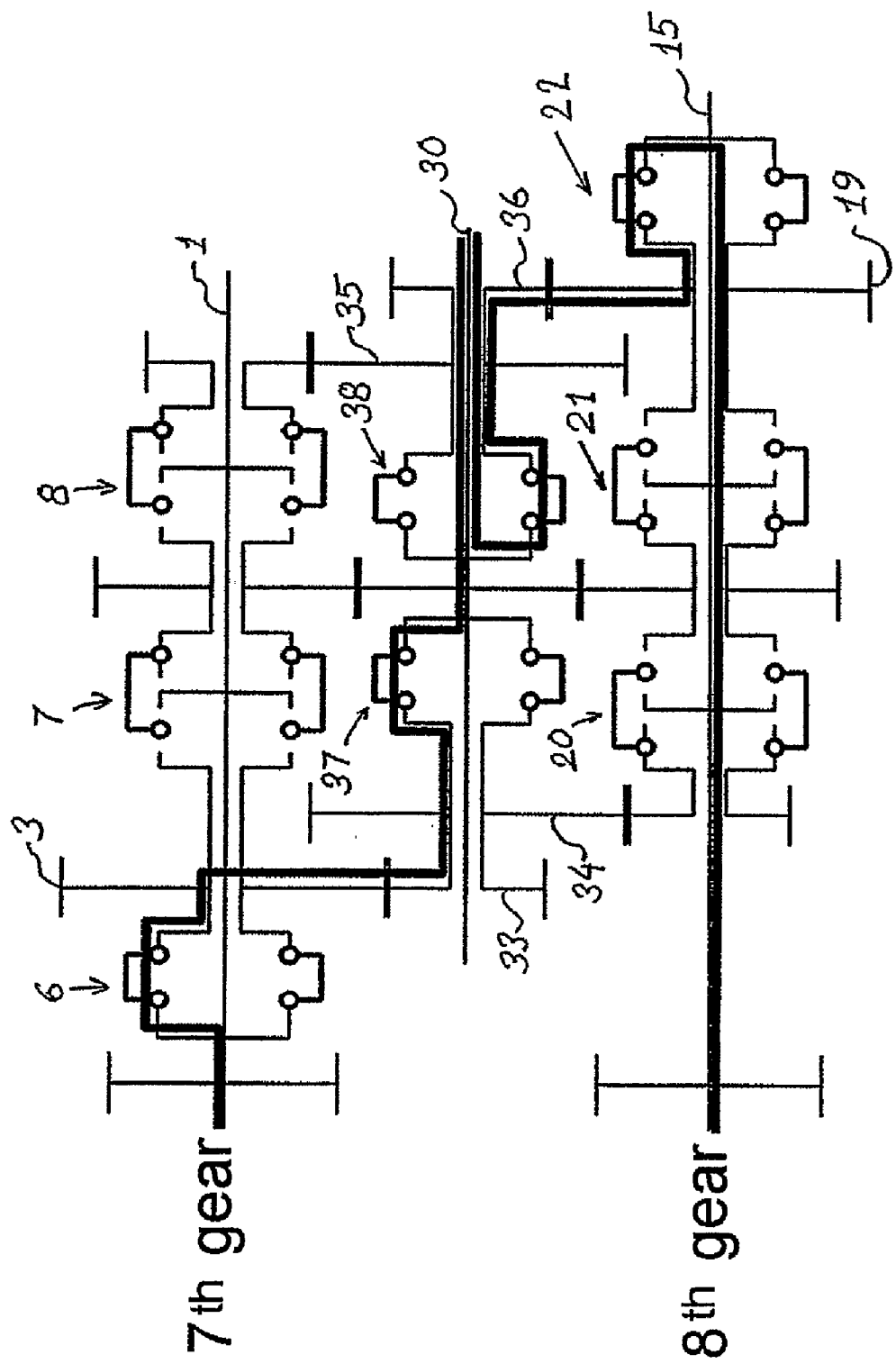

FIG. 4 illustrates the torque transmission in $7^{th}$ and $8^{th}$ gear. When transmitting torque in $7^{th}$ gear the shaft 1 drives, the clutches 7 and 8 are in their neutral positions and the clutch 6 is in its engagement position and locks the gearwheel 3 to the shaft 1. The clutch 37 is in its engagement position and locks the gearwheel pair 33, 34 to the shaft 30 for transmitting torque from the shaft 1 to the shaft 30 via the gearwheel 3 and the gearwheel pair 33, 34. When transmitting torque in $8^{th}$ gear the shaft 15 drives, the clutches 20 and 21 are in their neutral positions and the clutch 22 is in its engagement position and locks the gearwheel 19 to the shaft 16. The clutch 38 is in its engagement position for locking the gearwheel pair 35, 36 to the shaft 30 and transmitting torque from the shaft 15 to the shaft 30.

Figure 5:
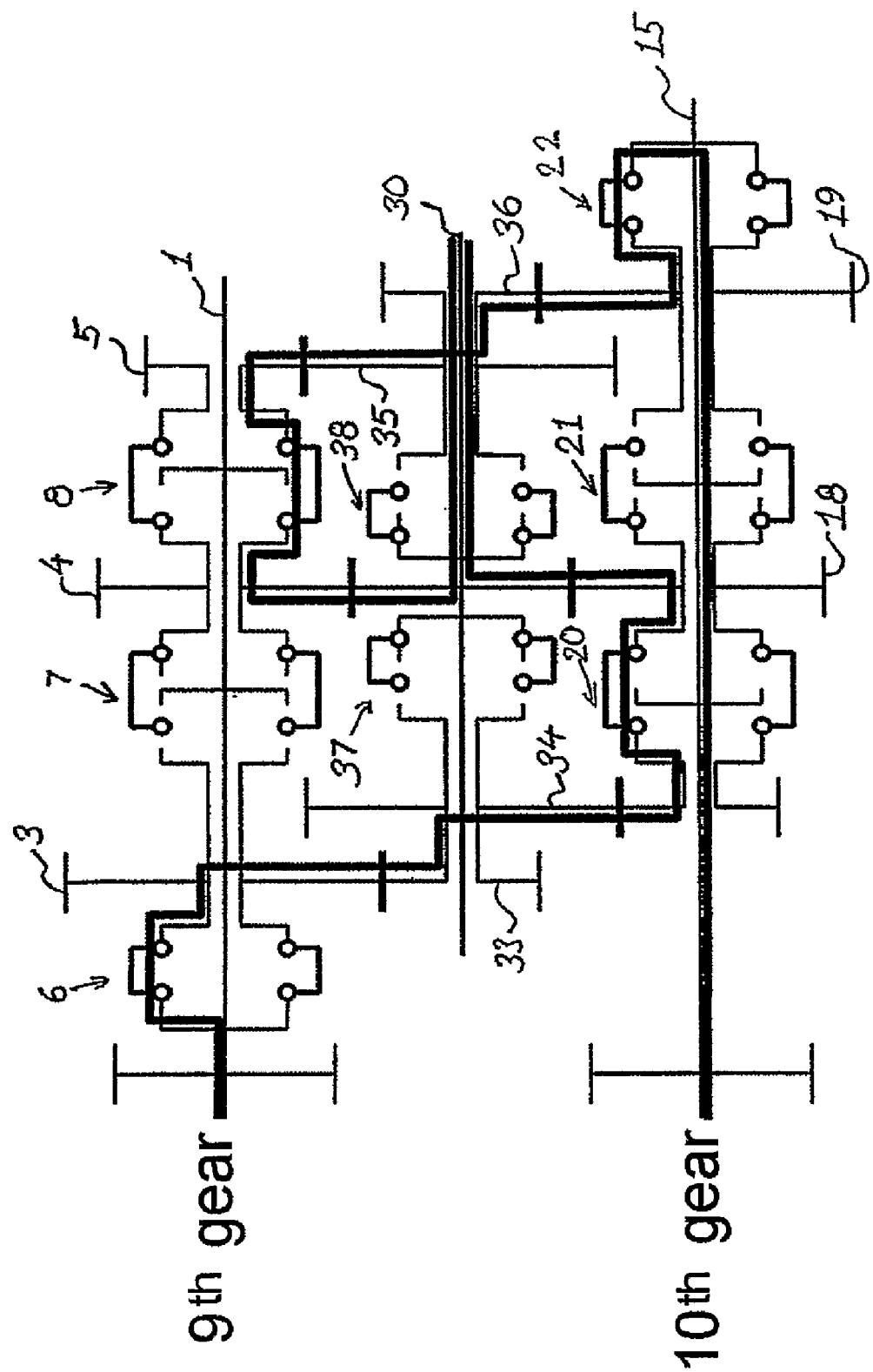

FIG. 5 illustrates the torque transmission in $9^{th}$ and $10^{th}$ gear. When transmitting torque in $9^{th}$ gear the shaft 1 drives. As in $7^{th}$ gear, the clutch 7 is in its neutral position, whilst the clutch 6 is in its engagement position and locks the gearwheel 3 to the shaft 1. $10^{th}$ gear is pre-selected in that the clutch 8 is in its first engagement position. The clutches 37 and 38 are in their neutral positions, whilst the clutch 20 on the shaft 15 is in its first engagement position and locks the gearwheels 17 and 18 together at the same time that these are disengaged from the shaft 15. The torque is now transmitted from the gearwheel 3 on the shaft 1 via the disengaged gearwheel pair 33, 34 on the shaft 30 and the disengaged gearwheel pair 17, 18 on the shaft 16 to the fixed gearwheel 31 on the shaft 30. When transmitting torque in $10^{th}$ gear the shaft 15 drives. The gearwheels 17 and 17 are disengaged from the shaft 15 by the clutches 20 and 21, whilst the clutch 22 is in its engagement position and locks the gearwheel 19 to the shaft 15. The clutches 37 and 38 are in their neutral positions, whilst the clutch 8 on the shaft 1 is in its first engagement position and locks the gearwheels 4,5 together at the same time that these are disengaged from the shaft 1. The torque is now transmitted from the gearwheel 19 on the shaft 15 via the disengaged gearwheel pair 35, 36 on the shaft 30 and the disengaged gearwheel pair 4,5 on the shaft 1 to the fixed gearwheel 31 on the shaft 30.

In the transmission according to the invention clutches 7, 8, 20 and 21 are therefore used, which in addition to the usual functions for transmission clutches of locking and disengaging gearwheels on an associated shaft here also have the further function of being able to lock adjacent gearwheels to the shaft together without locking the gearwheels on the shaft. Coupled gearwheels of different diameters can thereby be used to transmit torque with a gear ratio step from a driving shaft via an output shaft to a third shaft and thence back to the output shaft. This gives great freedom in selecting the gear ratio of the various gears compared to torque transmission between the shafts via a single common gearwheel. This makes it possible, using few constituent gearwheels and clutches, to produce a transmission having a large number of gear ratios with a large span between top and bottom gear. In the embodiment described a ten-gear transmission is achieved using just eleven gearwheels, except for the primary drive gearwheels.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A transmission, comprising:
   first, second, and third parallel shafts, the shafts being rotatably supported in a casing,;
   gearwheels carried by the shafts, the gearwheels intermeshing with one another in pairs for transmitting torque either between the first shaft and the third shaft, or between the second shaft and the third shaft, at least one gearwheel in each pair of intermeshing gearwheels being rotatably supported on its shaft and being adapted to be locked to or disengaged from its shaft by associated clutch members, at least two gearwheels rotatably supported on the first shaft and at least two gear wheels rotatably supported on the second shaft being coordinated by clutch members, the clutch members having neutral positions, the gearwheels being disengaged from their shaft and from one another when the clutch members are in the neutral positions, first engagement positions, the gearwheels being disengaged from the shaft and coupled together for rotation together in the first engagement positions, and second engagement positions, one of the gearwheels being disengaged and another one of the gearwheels being locked to the shaft in the second engagement positions, the gearwheels on each shaft meshing with gearwheels on the third shaft in order to permit the transmission of torque from the first shaft via the third and the second shaft back to the third shaft, and from the second shaft via the third and the first shaft back to the third shaft.

2. The transmission as claimed in claim 1, wherein a first, a second, and a third gearwheel are rotatably supported on the first shaft and on the second shaft, the gearwheels being coordinated by clutch members, the clutch members having neutral positions, the gearwheels being disengaged from their shaft when the clutch members are in the neutral positions, first engagement positions, either the first and the second gearwheel or the second and the third gearwheel being disengaged from their associated shaft but being coupled together for rotation together when the clutch members are in the first engagement positions, and second engagement positions, one of the gearwheels being locked to the shaft and the other gearwheels being disengaged when the clutch members are in the second engagement positions.

3. The transmission as claimed in claim 2, wherein one gearwheel of the first, second, and third gearwheels meshes with a common gearwheel arranged on the third shaft, while the other two gearwheels mesh with individual gearwheels on the third shaft.

4. The transmission as claimed in claim 3, wherein the third shaft has four gearwheels, the four gearwheels being adapted to rotate in pairs and being adapted to be locked to the shaft in pairs by clutch members, one gearwheel of the gearwheels adapted to rotate in pairs meshing with a gearwheel on the first shaft and a second gearwheel of the gearwheels adapted to rotate in pairs meshing with a gearwheel on the second shaft.

* * * * *